United States Patent [19]

Nakai

[11] Patent Number: 5,214,671
[45] Date of Patent: May 25, 1993

[54] ADAPTIVE EQUALIZER
[75] Inventor: Toshihisa Nakai, Tokyo, Japan
[73] Assignee: Oki Electric Industry Co., Ltd., Tokyo, Japan
[21] Appl. No.: 808,606
[22] Filed: Dec. 17, 1991
[30] Foreign Application Priority Data
  Feb. 13, 1991 [JP] Japan .................................... 3-20008
[51] Int. Cl.$^5$ ............................................... H03H 7/30
[52] U.S. Cl. ......................................... 375/14; 333/18; 364/724.2
[58] Field of Search ........................ 375/11, 12, 13, 14; 333/13, 28 R; 364/724.2
[56]     References Cited
    U.S. PATENT DOCUMENTS
    4,468,786  8/1984 Davis ...................................... 375/13
    4,849,989  7/1989 Kamerman ........................... 375/13
    4,912,725  3/1990 Hulth ..................................... 375/14
    4,979,184 12/1990 Bottoms et al. ................... 333/28 R Primary Examiner—Stephen Chin
Attorney, Agent, or Firm—Spencer, Frank & Schneider

[57]     ABSTRACT

An adaptive equalizer is provided with an equalizing assembly for equalizing an input signal having a transmission frame which includes a first training field and a second training field. The input signal is temporarily stored in a storage unit and simultaneously subjected to equalization by the equalizing assembly. An equalization error in the second training field is calculated and compared with a predetermined value. When the equalization error exceeds the predetermined value, the equalizing assembly is reset to do the equalizing operations over again from the head of the second training field, using the input signal stored temporarily in the storage unit.

16 Claims, 5 Drawing Sheets

ADAPTIVE EQUALIZER

BACKGROUND OF THE INVENTION

1. Field of the Invention

The present invention relates to an adaptive equalizer, and more particularly to a linear equalizer and a decision feedback equalizer adapted for removing intersymbol interference in a digital data transmission system.

2. Description of the Prior Art

Equalizers of this type are disclosed in U.S. Pat. No. 4,852,090 to Borth, for example. FIG. 3 is a block diagram showing the structure of such an equalizer. FIG. 4 shows the format of a transmission data frame employed with this equalizer. In FIG. 4, the symbols L1, M1, L2 and M2 represent a first training field, a first user's data field, a second training field and a second user's data field, respectively. Predetermined data are provided in the first and second training fields, and the same data have been stored in a memory unit 109 shown in FIG. 3.

Next, the operation of the equalizer mentioned above will be described. A signal y(n) received by a first input terminal 101 is applied to a shift register 102 and a coefficients regeneration unit 107. The signals stored in the shift registers 102 are multiplied in multiplication blocks 103 by associated coefficients $C_i$ (i = −N ... M) output from the coefficients regeneration unit 107, and the products are in turn applied to an adder 104, wherein both N and M are integers larger than zero. The adder 104 calculates the sum z(L) of all the products output from the multipliers 103 to produce a summation result, which is in turn applied to a decision block 105. The sum z(L) may be defined by the expression:

$$z(L) = \sum_{i=-N}^{M} C_i(L-1) y(L-i)$$

The decision block 105 outputs a decision result x(L) to an output terminal 110. A switch 108 has input terminals 108a and 108b. During first and second training intervals, switch 108 sequentially supplies the data stored in the memory unit 109 to an inverting input (−) of an adder 106, which substantially acts as a subtracter. During first and second user's data intervals the switch 108 sequentially supplies the output x(L) of the decision block 105 to the inverting input of the subtracter 106.

More specifically, the desired signals in the equalizer are, during the training intervals, the data stored in the memory unit 109, and alternatively, during the user's data intervals, the decision result output from the decision block 105. The subtracter 106 subtracts the output of the switch 108 from the output z(L) of the adder 104, and outputs the result of the subtraction to the coefficients regeneration unit 107 in the form of an equalization error signal e(L). In the coefficients regeneration unit 107, the received signal y(n) and the equalization error signal e(L) are used to update the coefficients of the multipliers 103 so as to follow up variations in the characteristics of the transmission line or transmission channel. The thus regenerated coefficients are supplied to the multipliers 103. Algorithms for coefficients regeneration are known, and include the RLS (Recursive Least Square) algorithm, the LMS (Least Mean Square) algorithm, and the like. FIG. 5 shows a block diagram of the coefficients regeneration unit 107 in the case of using the RLS algorithm for the purpose of coefficients regeneration. Now, the following equations are given:

$$q^T(L) = (y(L+N), y(L+N-1), \ldots, y(L), \ldots, y(L-M))$$

$$c^T(L) = (c_{-N}(L), c_{-N+1}(L), \ldots, c_0(L), \ldots, c_M(L))$$

where T represents transposition of a vector, and the underline represents a column vector. Further, in the block diagram shown in FIG. 5, k(L) is the (N+M+1)-th order vector, and P(L) is the (N+M+1)-th order square matrix.

First, upon receipt of a start signal supplied through a second input terminal 111, P(L) and c(L) are set to initial values P(0) and c(0), respectively. Thereafter, arithmetic operations are performed, whenever the received signal y(L+N) is entered through the first input terminal 101, in accordance with the expressions:

$$k(L) = p(L-1)q(L)\{1 + q^T(L)p(L-1)q(L)\}^{-1}$$

$$c(L) = c(L-1) + k(L)e(L)$$

$$p(L) = p(L-1) - k(L)q^T(L)p(L-1)$$

where $c_i(L)$ (i = −N ... M) is output to the multipliers 103.

The arithmetic operations in the coefficients regeneration unit 107 are performed usually by program sequences in a DSP (Digital Signal Processor).

However, according to the conventional equalizers of the type stated above, if rapid variations in the transmission channel characteristics occur, regeneration of tap coefficients of the equalizer does not follow the variations in the transmission channel characteristics. Thus, the tap coefficients at the time of termination of the first user's data field become independent of the transmission channel characteristics. Consequently, the conventional equalizers have the drawback that proper tap coefficients cannot be obtained in the second training interval indicated by the symbol L2, even if proper desired signals can be obtained in the second training field.

SUMMARY OF THE INVENTION

It is therefore an object of the present invention, in view of the foregoing problems, to provide an adaptive equalizer capable of following up rapid variations in the characteristics of the transmission line or channel.

In a preferred embodiment, an adaptive equalizer comprises an equalizing assembly for equalizing an input signal having a transmission frame including a first training field and a second training field, a storage unit for temporarily storing the input signal, an error calculator for calculating an equalization error in the second training field, and a comparator for comparing the equalization error with a predetermined value. If the equalization error exceeds the predetermined value, the equalizing assembly is reset to repeat the equalizing operations from the head of the second training field, using the input signal stored temporarily in the storage unit.

BRIEF DESCRIPTION OF THE DRAWINGS

The objects and features of the present invention will become more apparent from a consideration of the following detailed description taken in conjunction with the accompanying drawings, in which.

DESCRIPTION OF THE PREFERRED EMBODIMENT

Figure 3:
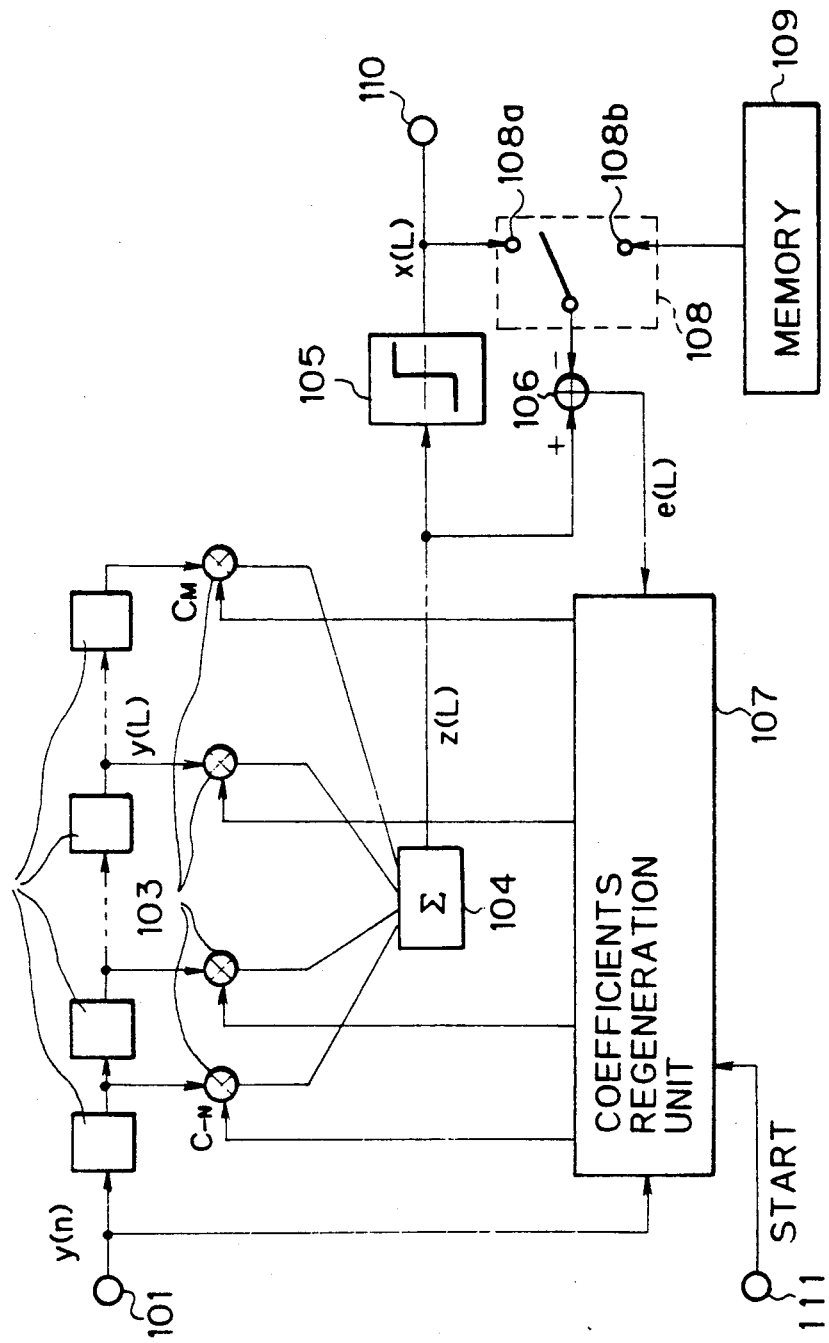
FIG. 3 is a schematic block diagram showing a conventional adaptive equalizer.
Figure 4:
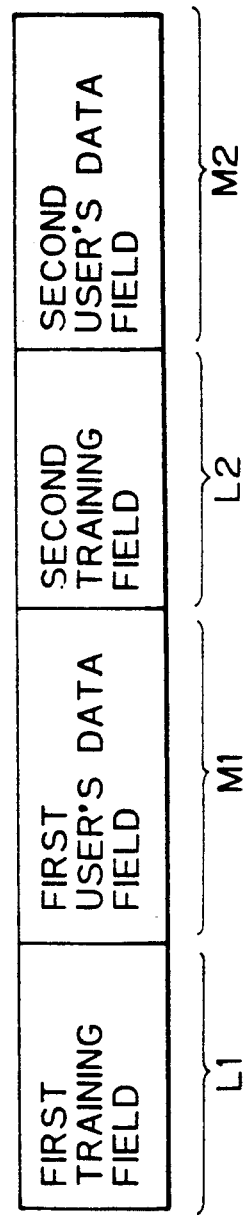
FIG. 4 is a view exemplarily showing the format of a transmission data frame.
Figure 5:
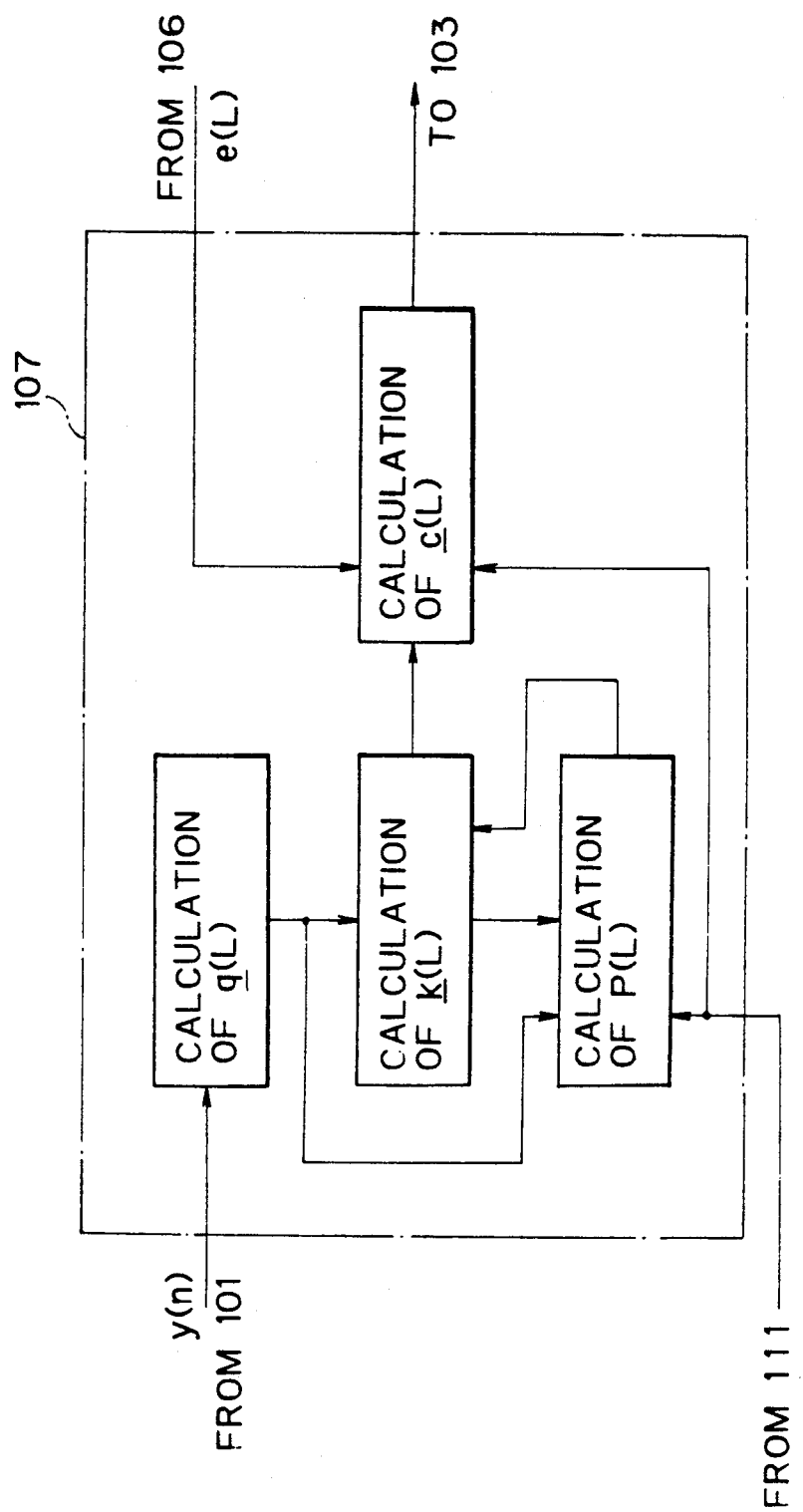
FIG. 5 is a schematic block diagram showing an example of the coefficients regeneration unit shown in FIG. 3.

Familiarity with the discussion of FIGS. 3 and 4 presented above will be assumed during the following description.

Figure 1:
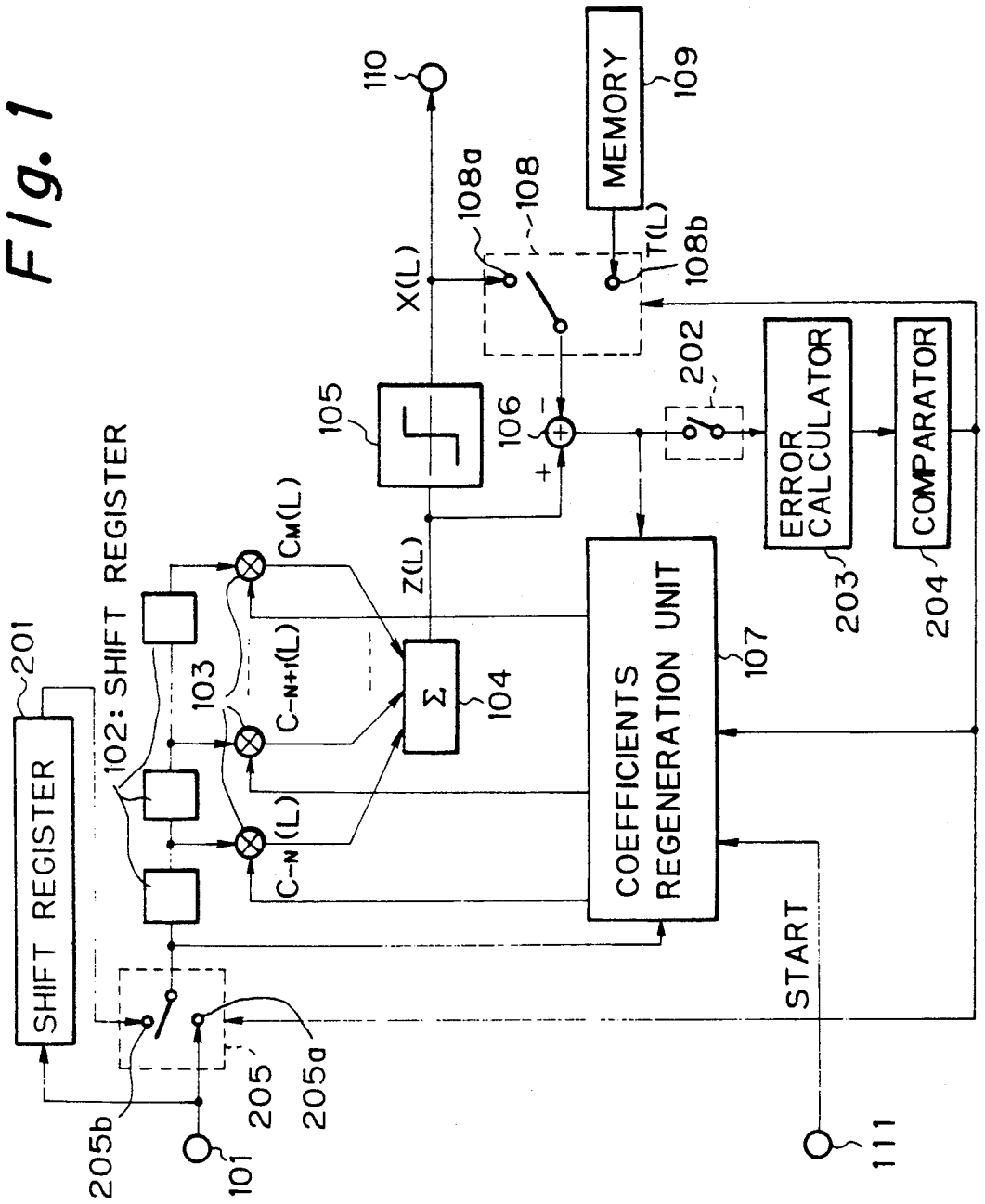
FIG. 1 is a schematic block diagram showing an illustrative embodiment of an equalizer according to the present invention.

Referring to FIG. 1, schematically showing an illustrative embodiment of the present invention, reference numeral 201 designates a second shift register having $N+M+L2$ stages, 202 designates a third switch, 203 designates a calculation unit for equalization error, 204 designates a comparator, and 205 designates a second switch. Regarding the remaining constituent elements, like elements are denoted by the same reference numbers as those in FIG. 3. Those elements constitute in combination a linear or decision feedback type of equalizer adapted to equalize a signal received from a transmission line or channel on an input port 101 and to produce a resultant signal from output port 110 to a utility circuit, not shown. The signal applied to the first input terminal 101 corresponds to a transmitted signal having the frame structure shown in FIG. 4. The memory unit 109 stores data that is the same as the first training data and the second training data.

In operation, prior to transmission, the second switch 205 is switched to its terminal 205a, and the third switch 202 is opened. Next, a start signal is supplied to the second input terminal 111 so as to reset the coefficients regeneration unit 107. The received signals $y(n)$ ($n=1 \ldots N+L1+M1+L2+M2$) supplied through the input terminal 101 are sequentially stored in the second shift register 201, and simultaneously applied through the second switch 205 to the first shift register 102. As will be described later, a processing for $n=1 \ldots N$ (initialization), a processing for $n=1 \ldots N+L1$ (processing on the first training field), a processing for $n=N+L1+1 \ldots N+L1+M1$ (processing on the first user's data field), a processing for $n=N+L1+M1+1 \ldots N+L1+M1+L2$ (processing on the second training field), and a processing for $n=N+L1+M1+L2+1 \ldots N+L1+M1+L2+M2$ (processing on the second user's data field) are carried out in the named order.

Regarding $n=1 \ldots N$, the received signals $y(n)$ are sequentially supplied through the second switch 205 to the first shift register 102 (initialization).

Regarding $n=N+1 \ldots N+L1$, the following processing, or processing on the first training field, is performed whenever each of the symbols in the received signals $y(n)$ is supplied through the second switch 205 to the first shift register 102. The first switch 108 is switched to the terminal 108b. The contents in the stages of the first shift register 102 and the associated coefficients $Ci(L-1)$ ($i=-N \ldots M$) are applied to the multipliers 103. The products produced by multipliers 103 are supplied to the subtracter 104 to obtain the sum $z(L)$. The sum $z(L)$ may be described by the expression:

$$z(L) = \sum_{i=-N}^{M} Ci(L-1) y(L-i)$$

where $L=n-N$.

The sum $z(L)$ is applied to the decision block 105 and also to a non-inverting input (+) of the subtracter 106. On the other hand, the first training data is read out from the memory unit 109, and supplied to the inverting input (−) of the subtracter 106. The subtracter 106 subtracts the first training data from the thus-obtained sum $z(L)$, and outputs the subtraction result $e(L)$ to the coefficient regeneration unit 107. The subtraction result $e(L)$ may be described by the expression:

$$e(L) = z(L) - T(L)$$

where $T(L)$ is defined as the first training data.

Using both $e(L)$ and the received signals $y(n)$, the coefficient regeneration unit 107 update the coefficients to be output to the multipliers 103 so as to follow up the variations in the characteristics of the transmission channel.

Figure 2:
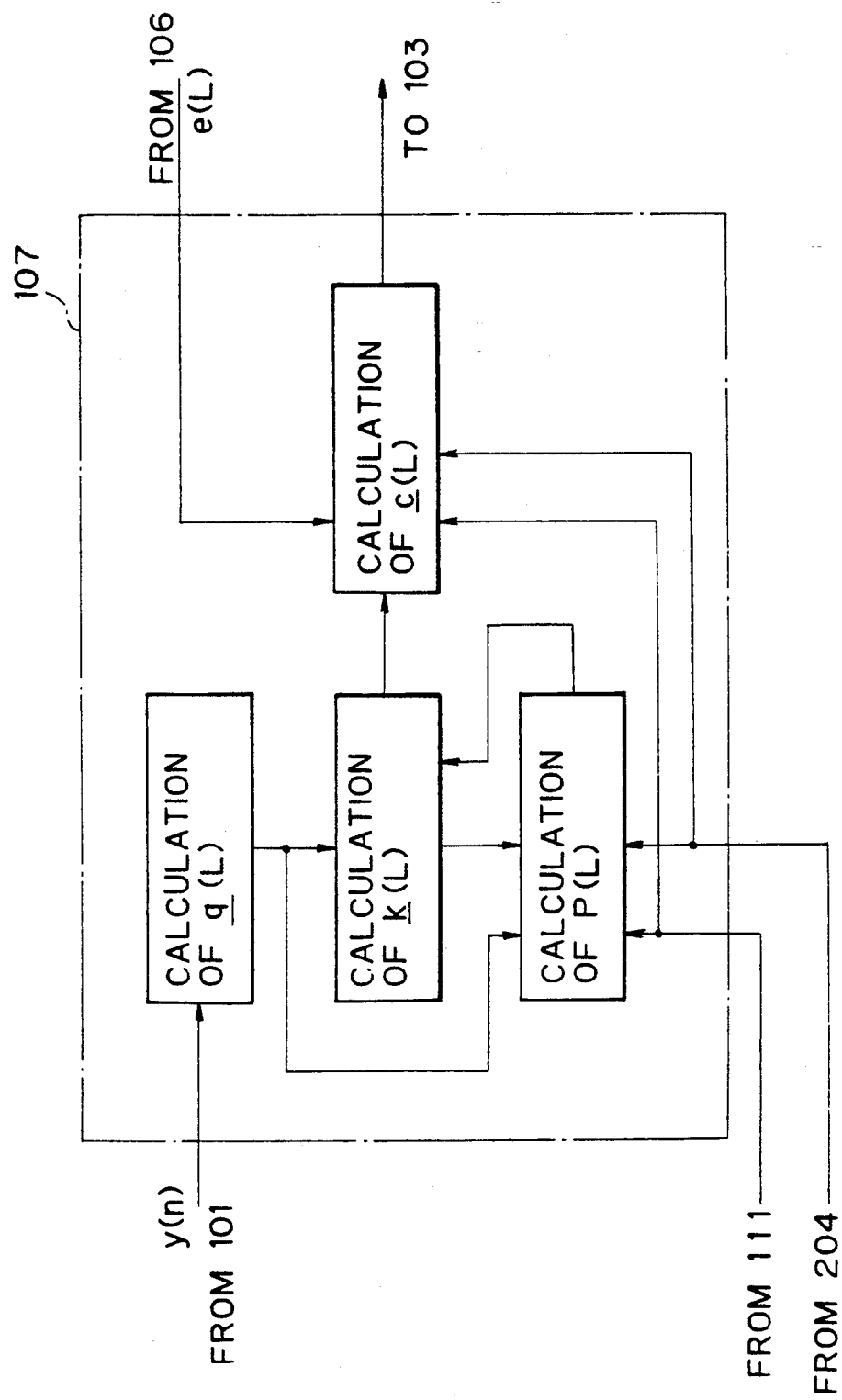
FIG. 2 is a schematic block diagram showing an illustrative embodiment of the coefficients regeneration unit shown in FIG. 1.

A variety of algorithms for coefficients regeneration are known. FIG. 2 is a schematic block diagram showing an example of the coefficients regeneration unit 107 which employs, by way of example, the RLS algorithm for coefficients regeneration. Arithmetic operations are performed in the operative blocks in accordance with the expressions:

$$k(L) = p(L-1)q(L)\{1 + q^T(L)p(L-1)q(L)\}^{-1}$$

$$c(L) = c(L-1) + k(L)e(L)$$

$$p(L) = p(L-1) - k(L)q^T(L)p(L-1)$$

where the following relationships are given:

$$q^T(L) = (y(L+N), y(L+N-1), \ldots, y(L), \ldots, y(L-M))$$

$$c^T(L) = (c_{-N}(L), c_{-N+1}(L), \ldots, c_0(L), \ldots, c_M(L))$$

The generated coefficients $Ci(L)$ are output to the multipliers 103 to be used for processing the successive input data. Such processing is repeated whenever one symbol is input. When the processing for $n=N+L1$ is terminated, the first switch 108 is switched to the terminal 108a. The sum $z(L)$ applied to the decision block 105 is subjected to decision and then output through the output terminal 110.

The processing for $n=N+L1+1 \ldots N+L1+M1$ (processing on the first user's data field) is the same as the processing for $n=N+1 \ldots N+L1$ (processing on the first training field), except that the inverting input (−) of the subtracter 106 receives the decision data $x(L)$ instead of the first training data $T(L)$ since the first switch 108 has been switched to the terminal 108a. The sum $z(L)$ output from the adder 104 is supplied to the decision block 105 as well as the non-inverting input (+) of the subtracter 106, and is subjected to decision and then output in the form of the decision data $x(L)$. The decision data $x(L)$ is output from the output terminal 110 and is also supplied through the first switch 108 to the inverting input (−) of the subtracter 106. Consequently, the output e(L) of the subtracter 106 may be described by the expression:

$$e(L) = z(L) - x(L)$$

When the processing for n=N+L1+M1 is terminated, the first switch 108 is switched to the terminal 108b, and the third switch 202 is closed.

The processing for n=N+L1+M1+1 . . . N+L1+M1+L2 (processing on the second training field) is done in the following manner. The same processing as the processing for n=N+1 . . . N+L1 (processing on the first training field) stated above is implemented whenever one symbol of the received signals y(n) is supplied, and the subtracter 106 outputs e(L). Now, since the first switch 108 has been switched to the terminal 108b, the equalization error signal e(L) is given with a difference between the output z(L) of the adder 104 and the second training data T(L) read out from the memory unit 109. The signal e(L) is applied through the third switch 202 to the equalization error calculation unit 203 as well as the coefficients regeneration unit 107. The equalization error calculation unit 203 calculates a sum E of equalization error energy, using the signal e(L) in the case of L=L1+M1+1 . . . L1+M1+L2, based on the following expression, for example:

$$E = \sum_{L=L1+M1+1}^{L1+M1+L2} |e(L)|^2$$

The calculation of the sum E is not restricted to this equation. That is, there are many variations, such as a scheme in which absolute values are summed, or a scheme in which a limit of the summation is shortened. The output E of the equalization error calculation unit 203 is applied to the comparator 204 and compared with a predetermined value (S). The case of E<S means that the equalizer should follow up the variations in the transmission channel. The case of E≧S means that the equalizer should not follow up the variations in the transmission channel. The comparator 204 transfers the comparison result to the coefficients regeneration unit 107, the first switch 108 and the second switch 205 in order to control them.

The processing for n=N+L1+M1+L2+1 . . . N+L1+M1+L2+M2 (processing on the second user's data field) varies in accordance with the comparison result of the comparator 204. More specifically, in the case of E<S, the first switch 108 is switched to the terminal 108a, and the same processing as the processing for n=N+L1+1 . . . N+L1+M1 (processing on the first user's data field) stated above is implemented.

In the case of E≧S, first, the second switch 205 is switched to the terminal 205b, so that (M+N) pieces of data y(n) (n=L1+M1+1−M . . . L1+M1+N), which have been stored in the second shift register 201, are sequentially applied through the second switch 205 to the first shift registers 102 and the coefficients regeneration unit 107. Then the coefficients regeneration unit 107 is reset. More specifically, assuming that the RLS algorithm is used in the coefficients regeneration unit 107, p(L) and c(L) are set to p(0) and c(0), respectively. Next, whenever L2 pieces of data y(n) (n=N+L1+M1+1 . . . N+L1+M1+L2) are entered one by one from the second shift register 201 through the second switch 205 to the first shift registers 102, formation of z(L), formation of e(L) and regeneration of the coefficients are implemented in the same way as the case of processing on the second training field as stated above. When the above processing is terminated, the first switch 108 is switched to the terminal 108a. Thereafter, the received signals corresponding to the second user's data field, which have been stored in the second shift register 201, are sequentially applied to the first shift registers 102, and the same processing as the case of E<S is accomplished.

It is noted that the above-mentioned operations on the units or sections shown in FIG. 1 are performed in response to the control signals output from a control unit, which is not specifically illustrated for the sake of simplicity.

While the present invention has been described with reference to an illustrative embodiment of the linear equalizer, it is apparent that the present invention is applicable to other adaptive equalizers such as a decision feedback equalizer, taught by John G. Proakis in "Digital Communications" McGraw-Hill Book Company, 1983, pp. 593-598, for example.

As described above, according to the present invention, whether or not the equalizer follows up variations in a channel is detected by means of calculation of equalization errors in the second training field in the input signals, and if appropriate, the equalizer is reset to do over again the equalization operation. Accordingly, it is possible to realize an adaptive equalizer capable of following up even rapid variations.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What I claim is:

1. An adaptive equalizer for equalizing an input signal having a transmission frame which includes a first training field and a second training field, comprising:
   an input terminal to receive the input signal;
   an output terminal;
   equalizing means, between the input and output terminals, for equalizing the input signal received at the input terminal to generate an equalized signal at the output terminal, the equalizing means including
      first means, operative in response to a first signal, for generating a second signal from the input signal
      second means for generating the equalized signal from the second signal,
      memory means for storing first and second values, and
      third means for subtracting the first and second values stored in the memory means from the second signal to provide a difference signal which represents an equalized error in the first and second training fields, the difference signal being included in the first signal supplied to the first means;
   storage means for temporarily storing the input signal;
   error calculator means, operative in response to the difference signal, for calculating an equalization error in the second training field;
   comparator means for comparing the equalization error in the second training field with a predetermined value; and control means, operative in response to the comparator means, for resetting the equalizing means and for causing the equalizing means to repeat equalizing operations from a head of the second training field by using the input signal stored in said storage means when the equalization error in the second training field exceeds a predetermined value.

2. An adaptive equalizer according to claim 1, wherein said first means comprises:
   first shift register means for storing the input signal received at the input terminal;
   coefficient regeneration means, operative in response to the first signal, for regenerating equalization coefficients;
   multiplication means for multiplying the input signal stored in the first shift register means with the equalization coefficients to produce a plurality of products; and
   adder means for calculating a sum of all of the products to produce the second signal.

3. An adaptive equalizer according to claim 2, wherein said coefficient regeneration means is reset when the equalization error exceeds the predetermined value.

4. An adaptive equalizer according to claim 2, wherein said coefficient regeneration means is operative in accordance with a Recursive Least Square algorithm for coefficients regeneration.

5. An adaptive equalizer according to claim 2, wherein said coefficient regeneration means is operative in accordance with a Least Mean Square algorithm for coefficients regeneration.

6. An adaptive equalizer according to claim 1, wherein said storage means comprises a shift register.

7. An adaptive equalizer according to claim 1, wherein said equalizer is a linear equalizer.

8. An adaptive equalizer according to claim 1, wherein said equalizer is a decision feedback equalizer.

9. An adaptive equalizer according to claim 2, wherein the transmission frame additionally includes user's data fields, wherein the second means comprises decision means, operative in response to the sum, for generating the equalized signal, and wherein the third means additionally comprises means for subtracting the equalized signal from the sum during the user's data fields to supply a signal to the coefficient regeneration means and the comparator means during the user's data fields.

10. An adaptive equalizer according to claim 9, wherein the storage means comprises a second shift register, and wherein the control means comprises switch means, operative in response to the comparator means, for selectively providing to the first shift register either the input signal received at the input terminal or the content of the second shift register.

11. A method of equalizing an input signal having a transmission frame which includes a first training field and a second training field having a head, comprising the steps of:
   equalizing the input signal in response to a first signal to produce an equalized signal, the step of equalizing including the steps of generating a second signal from the input signal and the first signal, and subtracting first and second values stored in a memory from the second signal to produce a difference signal which represents an equalized error in the first and second training fields, the difference signal being included in the first signal;
   temporarily storing the input signal in a storage unit;
   calculating an equalization error in the second training field in response to the first signal;
   comparing the equalization error with a predetermined value; and
   equalizing the input signal over again from the head of the second training field if the equalization error exceeds the predetermined value, using the input signal stored temporarily in said storage unit.

12. An improved adaptive equalizer for receiving an input signal having a transmission frame that includes first and second training fields, and for producing from the input signal an output signal having reduced interference, the adaptive equalizer including first shift register means having a plurality of stages for storing the input signal; coefficient regeneration unit means, responsive to the input signal and an equalization error signal, for regenerating equalization coefficients; multiplication means for multiplying the contents of the stages of the first shift register means by the equalization coefficients to produce a plurality of products; summing means for summing the products to produce a sum signal; decision means for generating the output signal from the sum signal; and equalization error means, responsive to the sum signal and the output signal, for generating the equalization error signal, the equalization error means including memory means for storing data matching the first and second training fields of the input signal, the data stored in the memory means being employed by the equalization error means during the first and second training fields of the input signal, wherein the improvement comprises:
   second shift register means for temporarily storing the input signal;
   error calculator means, responsive to the equalization error signal, for calculating an equalization error in the second training field;
   comparator means for comparing the equalization error in the second training field with a predetermined value; and
   switch means, responsive to the comparator means, for selectively supplying either the input signal or the content of the second shift register means to the first shift register means.

13. The adaptive equalizer of claim 12, wherein the coefficient regeneration unit means comprises means for regenerating coefficients in accordance with a Recursive Least Square algorithm.

14. The adaptive equalizer of claim 12, wherein the coefficient regeneration unit means comprises means for regenerating coefficients in accordance with a Least Means Squire algorithm.

15. The adaptive equalizer of claim 12, wherein the equalizer is a linear equalizer.

16. The adaptive equalizer of claim 12, wherein the equalizer is a decision feedback equalizer.

* * * * *